United States Patent
Franca-Neto

(12) 
(10) Patent No.: US 6,445,220 B1
(45) Date of Patent: Sep. 3, 2002

(54) METHOD AND APPARATUS FOR FULLY-DIFFERENTIAL HALF-CIRCULATOR FOR BI-DIRECTIONAL SMALL-SIGNAL SIGNALING

(75) Inventor: Luiz M. Franca-Neto, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/717,465

(22) Filed: Nov. 20, 2000

(51) Int. Cl.[7] .............................................. H02M 11/00

(52) U.S. Cl. ....................................................... 327/103

(58) Field of Search .............................. 327/52, 55, 56, 327/63, 65, 69, 82, 89, 90, 103, 105, 106; 341/143, 110; 326/30, 63, 41

(56) References Cited

U.S. PATENT DOCUMENTS

| | | | | |
|---|---|---|---|---|
| 5,686,867 A | * | 11/1997 | Sutardja et al. | 331/157 |
| 5,850,163 A | * | 12/1998 | Drost et al. | 331/115 |
| 6,029,060 A | * | 2/2000 | Ashby | 455/326 |
| 6,104,254 A | * | 8/2000 | Iravani | 331/57 |

* cited by examiner

Primary Examiner—My-Trang Nu Ton
(74) Attorney, Agent, or Firm—Dennis A. Nicholls

(57) ABSTRACT

A method and apparatus for a half-circulator is described. In one embodiment, the half-circulator may be used in a bus between processing units or other logical blocks using small-signaling with current-mode logic. For this reason, the half-circulator implements addition and subtraction of small-signal currents. Using small-signal signaling, the half-circulator (and the bus containing half-circulators by extension) improves robustness against noise from the power supply lines, and minimizes the added jitter suffered by other schemes when implemented on a bus with several tapping nodes.

23 Claims, 9 Drawing Sheets

METHOD AND APPARATUS FOR FULLY-DIFFERENTIAL HALF-CIRCULATOR FOR BI-DIRECTIONAL SMALL-SIGNAL SIGNALING

FIELD OF THE INVENTION

The present invention relates generally to a circuit for interfacing voltage-mode logic by means of transmitting and receiving current signals, and more specifically to a fully-differential half-circulator for bi-directional small-signal signaling.

BACKGROUND

Multi-gigabit per second wireline (operating on physical wires) bi-directional communication is necessary for putting together the functional sub-units that make up high performance computers. These multi-gigabit per second wireline channels can connect multiple microprocessors, microprocessors and memory blocks, or any other high-performance logic units requiring high-speed data feeding.

Previous implementations of wireline signaling have tried to fight noise and jitter by using large-signals (signals having excursions in voltage comparable to the supply voltage values used) in the signaling scheme. Unfortunately, the use of large signals itself induces distortion into the signal, even though it was thought that the large amplitude of the signals would overcome the noise. It exposes the signals both to noise from the power supply lines, and to "self-inflicted" jitter. This is because large-signal signaling usually uses rail-to-rail voltage signals, thus making the amplitude of the signals defined by the value of the power supply. Therefore, fluctuations in power supply voltage will map directly into both fluctuations in the signal amplitude (noise) and fluctuation in the signal's rising and falling edge rates (jitter).

Moreover, the use of large-signals signaling makes bi-directional signaling implementation unreliable at high data rates. This may occur because the receivers and transmitters are strongly upset by the signals themselves, compromising the receivers' and transmitters' ability to properly add and subtract signals, which are required operations for enabling bi-directional signaling.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention, the fully-differential half-circulator, is a fundamental building block for enabling bi-directional small-signal signaling. It is based on current-mode signaling. The circuitry is configured so that immunity to power-supply noise and self-inflicted jitter is provided by three factors: the small-signal nature of the signaling itself, the differential circuit topology used; and the extra noise filtering at the supply leads added to the core circuitry.

A method and apparatus for a half-circulator is described. In one embodiment, the half-circulator may be used in a bus between processing units or other logical blocks using small-signaling with current-mode logic. For this reason the half-circulator implements addition and subtraction of small-signal currents. Using small-signal signaling, the half-circulator (and the bus containing half-circulators by extension) improves robustness against noise from the power supply lines, and minimizes the added jitter suffered by other schemes when implemented on a bus with several tapping nodes.

Figure 1:
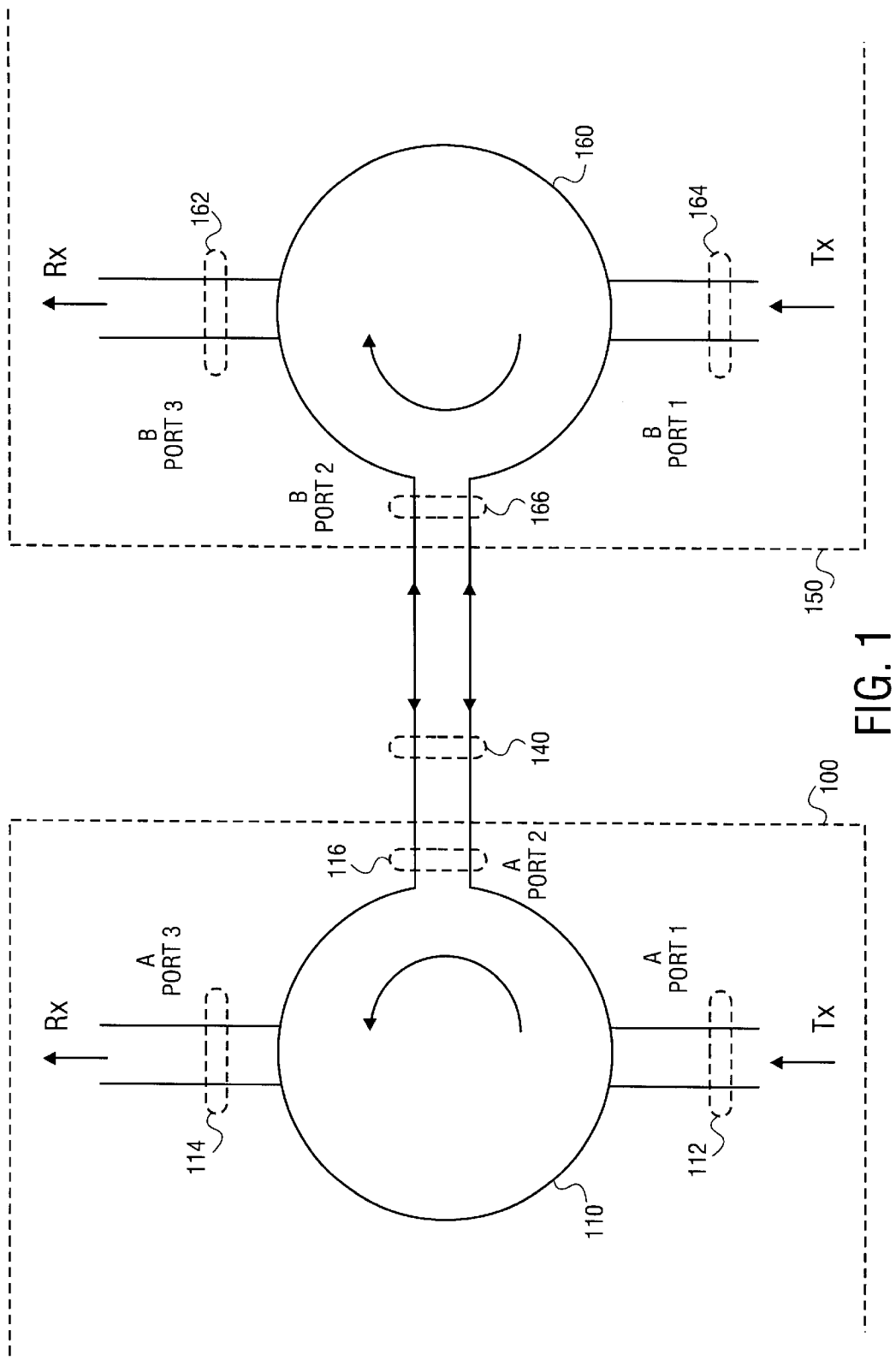
FIG. 1 is a diagram of two half-circulators connecting a pair of high-speed systems, according to one embodiment of the present invention.

Referring now to FIG. 1, a diagram of two half-circulators 110, 160 connecting a pair of high-speed systems 100, 150 is shown, according to one embodiment of the present invention. Half-circulators 110, 160 communicate over a bi-directional differential current-mode interface 140. High-speed systems 100, 150 may be microprocessors, digital signal processors (DSP), memory blocks, or any other kind of system requiring high-speed data communications between units. High-speed systems 100, 150 may be similar units such as two microprocessors (peer to peer communications), or they may be dissimilar units such as one microprocessor and one memory block.

When high-speed system 100 wishes to transmit data to high-speed system 150, data is sent in via A port 1 112. The A half-circulator 110 converts the data arriving via A port 1 112 into a differential current-mode signal and sends it out on A port 2 116. This differential current-mode signal travels across bi-directional bus 140 and enters B port 2 166 of B half-circulator 160. B half-circulator 160 receives the current-mode signal and outputs it locally on B port 3 162 as a voltage signal.

In the data transmission example above, data entering A port I 112 is blocked from appearing on A port 3 114. Any data appearing on A port 3 114 comes from a current-mode signal entering the A port 2 116 interface. Similarly, any data appearing on B port 3 162 comes from a current-mode signal entering the B port 2 166. This design permits the use of the current-mode bi-directional bus 140 without the requirement of handshaking or collision-detecting circuitry. An analogous effect happens for those signals system 150 wishes to transmit to system 100.

Figure 2:
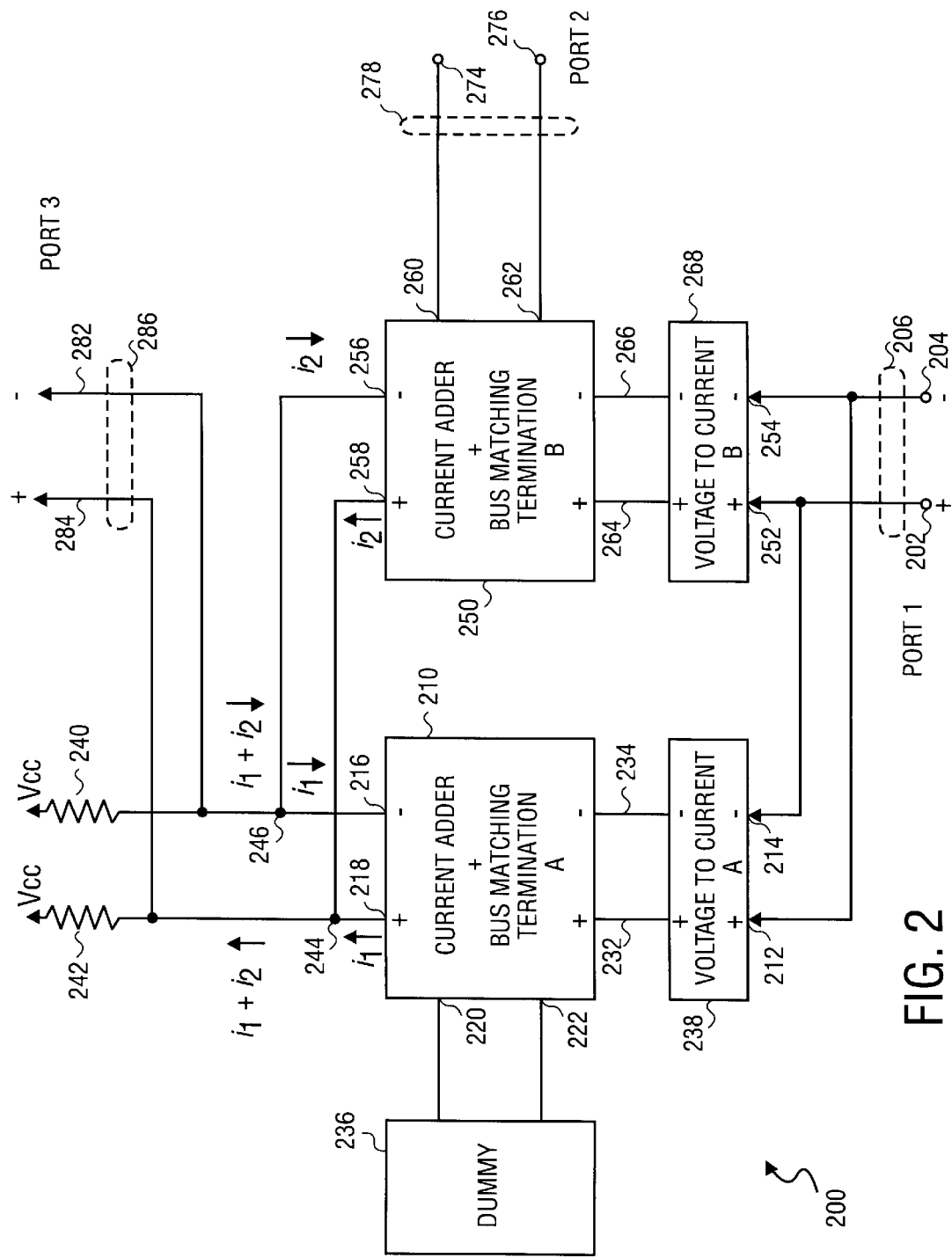
FIG. 2 is a block diagram of a half-circulator, according to one embodiment of the present invention.

Referring now to FIG. 2, a block diagram of a half-circulator 200 is shown, according to one embodiment of the present invention. In the FIG. 2 example, port 1 and port 3 are shown as differential voltage-mode circuits. In alternate embodiments, port 1 and port 3 may be single-ended circuits or may employ current-mode logic.

Half-circulator 200 includes two set of circuits, each with differential inputs and outputs, and each with a pair of connections for adding or subtracting differential currents. One of these two circuits is current adder and bus matching termination A 210 coupled with voltage-to-current converter A 238. The other circuit is current adder and bus matching termination B 250 coupled with voltage-to-current converter B 268.

Data enters port 1 as differential voltage signals on port 1 plus signal line 202 and port 1 minus signal line 204. The voltage signal on port 1 plus signal line 202 is directed to the plus input 252 of voltage-to-current converter B 268 but to the minus input 214 of voltage-to-current converter A 238. Similarly, the voltage signal on port 1 minus signal line 204 is directed to the minus input 254 of voltage-to-current converter B 268 but to the plus input 212 of voltage-to-current converter A 238. Routing signals to the plus input of one device and to the minus input of another device in this manner may be called "cross-connecting." Because the plus outputs 218, 258 of current adder and bus matching termination A 210 and current adder and bus matching termination B 250, respectively, are tied together, and because the minus outputs 216, 256 of current adder and bus matching termination A 210 and current adder and bus matching termination B 250, respectively, are tied together, mutual cancellation will occur. For this reason, any data presented on port 1 of half-circulator 200 will not emerge on port 3.

However, the cross-connection of voltage-to-current converter A 238 and voltage-to-current converter B 268 does not impede the transmission or reception of data on port 2 in differential current-mode mode. Only the current-mode terminals 260, 260 of current adder and bus matching termination B 250 are connected to the signal lines 274, 276 of port 2. The current-mode terminals 220, 222 of current adder and bus matching termination A 210 are instead connected to a dummy circuit 236 that balances the circuits of the two current adder and bus matching terminations. For this reason, output cancellation in current adder and bus matching termination A 210 and current adder and bus matching termination B 250 does not take place for signals arriving as current-mode differential signals on port 2. These signals may be sent out via minus output 256 and plus output 258 of current adder and bus matching termination B 250, with current-to-voltage conversion provided by pull-up resistors 240, 242.

Similarly, no cancellation occurs which would prevent port 1 data, arriving on plus input 252 and minus input 254, from generating current-mode signals within current adder and bus matching termination B 250 and sending them out via port 2.

In the FIG. 2 embodiment, the primary remaining concern for small-signal signaling would be the noise levels. But even in this case, the distances from chip-to-chip, or between subsystems in a high-performance computer, are in the range that makes signal attenuation acceptable. Additionally, the stronger components of disturbance, such as the self-induced effects of large-signal signaling schemes, are altogether avoided when using small-signal signaling. For example, the amplitude of the signals is not as sensitive to the fluctuations of the power supply levels when using small-signal signaling. This minimizes "self-inflicted" jitter.

Figure 3:
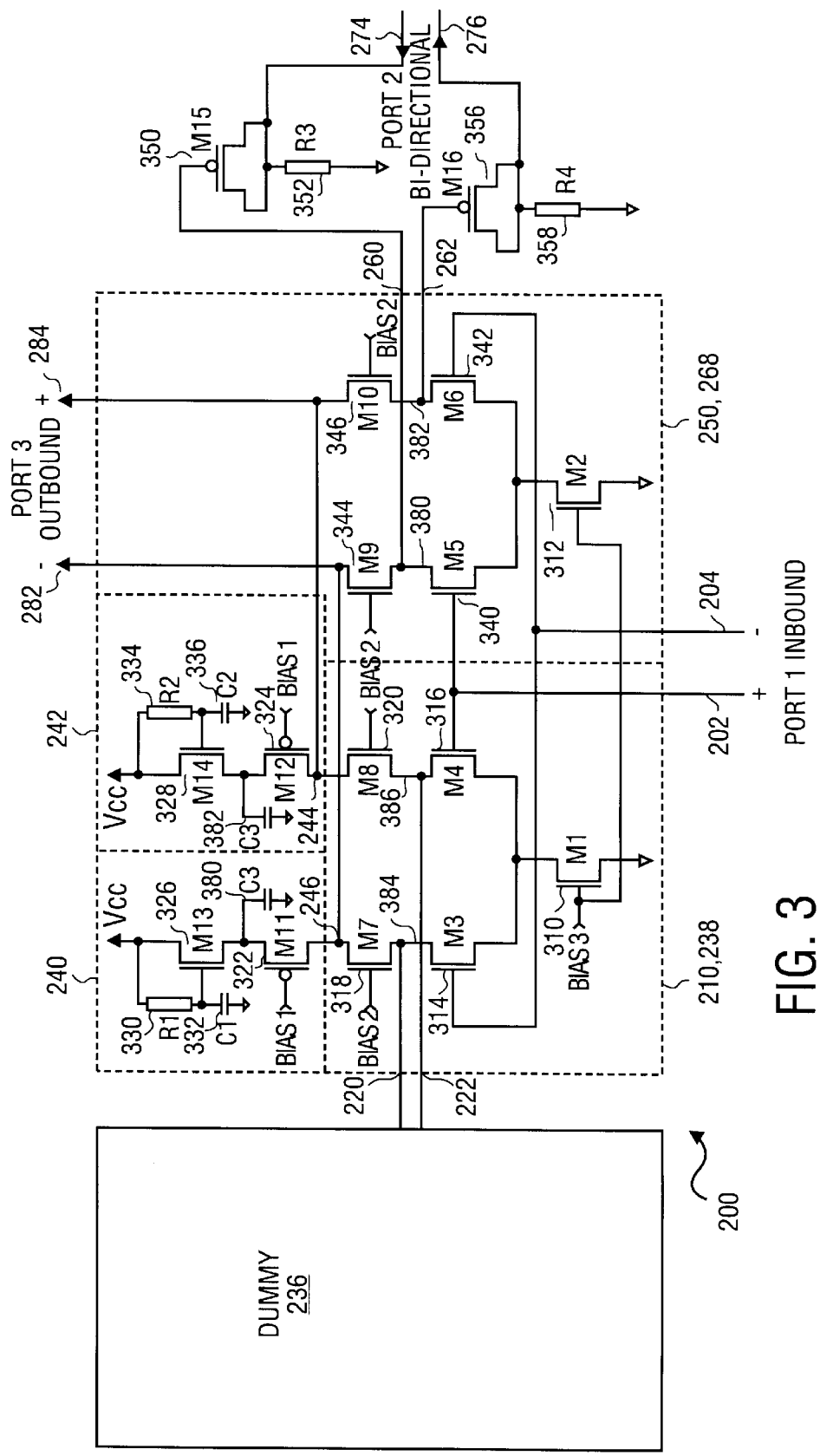
FIG. 3 is a schematic diagram of the half-circulator of FIG. 2, according to one embodiment of the present invention.

Referring now to FIG. 3, a schematic diagram of the half-circulator of FIG. 2 is shown, according to one embodiment of the present invention. The exemplary circuit of FIG. 3 discloses one embodiment of the half-circulator which uses n-channel metal-oxide-semiconductor (NMOS) transistors for the voltage-to-current converters 238, 268 and current adder and bus matching termination circuits 210, 250, NMOS and p-channel metal-oxide-semiconductor (PMOS) transistors for the pull-up resistors 240, 242, and PMOS transistors 350, 356 for AC coupling capacitors. In alternate embodiments the PMOS NMOS transistors may be replaced by other devices, such as junction field-effect transistors (JFET) or by bipolar junction transistors.

The circuit including NMOS transistor 326, PMOS transistor 322, resistor 330, and capacitors 332 and 380, and the circuit including NMOS transistor 328, PMOS transistor 324, resistor 334, and capacitors 336 and 382 form an additional noise blocking network to provide extra isolation between the half-circulator 200 and supply noise. This noise blocking network can provide approximately and extra 35 dB attenuation for noise coming from the supply lines. This blocking technique is only capable of implementation here because of the small-signal mode of operation of the half-circulator. This is therefore an additional advantage of using small-signal signaling in the present half-circulator. In one embodiment, resistors 330, 334 and capacitors 332, 336, 380, and 382 are realized as NMOS or PMOS transistors.

Capacitive coupling to the bi-directional bus is used in the half-circulator 200. AC coupling capacitors are realized by utilizing the gate-channel capacitance of PMOS transistors 350, 356, respectively. Both PMOS transistors 350, 356 are operating in accumulation mode. Resistors 352, 358 have high resistance values and function to supply reference ground levels to port 2 signal lines 274, 276.

NMOS transistors 312, 340, 342, 344, and 346 comprise the active circuits of voltage-to-current converter B 268 and current adder and bus termination B 250. Similarly, NMOS transistors 310, 314, 316, 318, and 320 comprise the active circuits of voltage-to-current converter A 238 and current adder and bus matching termination A 210.

The differential voltage-mode signals entering port 1 are converted to differential current-mode signals by NMOS transistors 340, 342 of voltage-to-current converter B 268, and by NMOS transistors 314, 316 of voltage-to-current converter A 238. The cross-connection of the differential voltage-mode signals, mentioned above in connection with FIG. 2, causes the voltage-to-current conversion to occur in-phase in voltage-to-current converter B 268 and inverted in voltage-to-current converter A 238. This causes a total cancellation of any output signals when the current signals flowing through NMOS transistors 318, 344 are added together at port 3 minus terminal 282, and when the current signals flowing through NMOS transistors 320, 346 are added together at port 3 plus terminal 284.

The voltage-mode signals entering port 1 at plus terminal 202 and minus terminal 204, upon conversion from voltage-mode into current-mode signals, are directed by current adder and bus matching termination A 210 to dummy 236 and by current adder and bus matching termination B 250 out upon the bi-directional bus of port 2. In the case of the current-mode signal of port 2, the voltage-mode signal entering port 1 is therefore transmitted to a remote system down the bi-directional bus.

A static bias voltage "bias 2" is applied to the gates of NMOS transistors 318, 320, 344, and 346. Because the bias at each of these four gates is the same, this is called a "common gate stage." Because of this bias, the NMOS transistors 318, 344 transfer current from their respective source nodes 384, 380 to the summing node 246. Similarly NMOS transistors 320, 346 transfer current from their respective source nodes 386, 382 to the summing node 244. Current-mode signals at summing nodes 246, 244 are converted to voltage-mode signals by the action of pull-up resistors 240, 242, respectively.

The sizes of NMOS transistors 318, 320, 344, and 346 are selected so that the inverse of their transconductance provides matching impedances for terminating the bi-directional bus entering port 2. When current-mode signals enter port 2 at input terminals 274, 276, the port 2 currents are added to the drain-source currents of NMOS transistors 340, 342 causing altered drain-source currents in NMOS transistors 344, 346. In this manner the current-mode signals from port 2 are passed to nodes 246, 244 where they are then converted to voltage-mode signals by pull-up resistors 240, 242.

Figure 4:
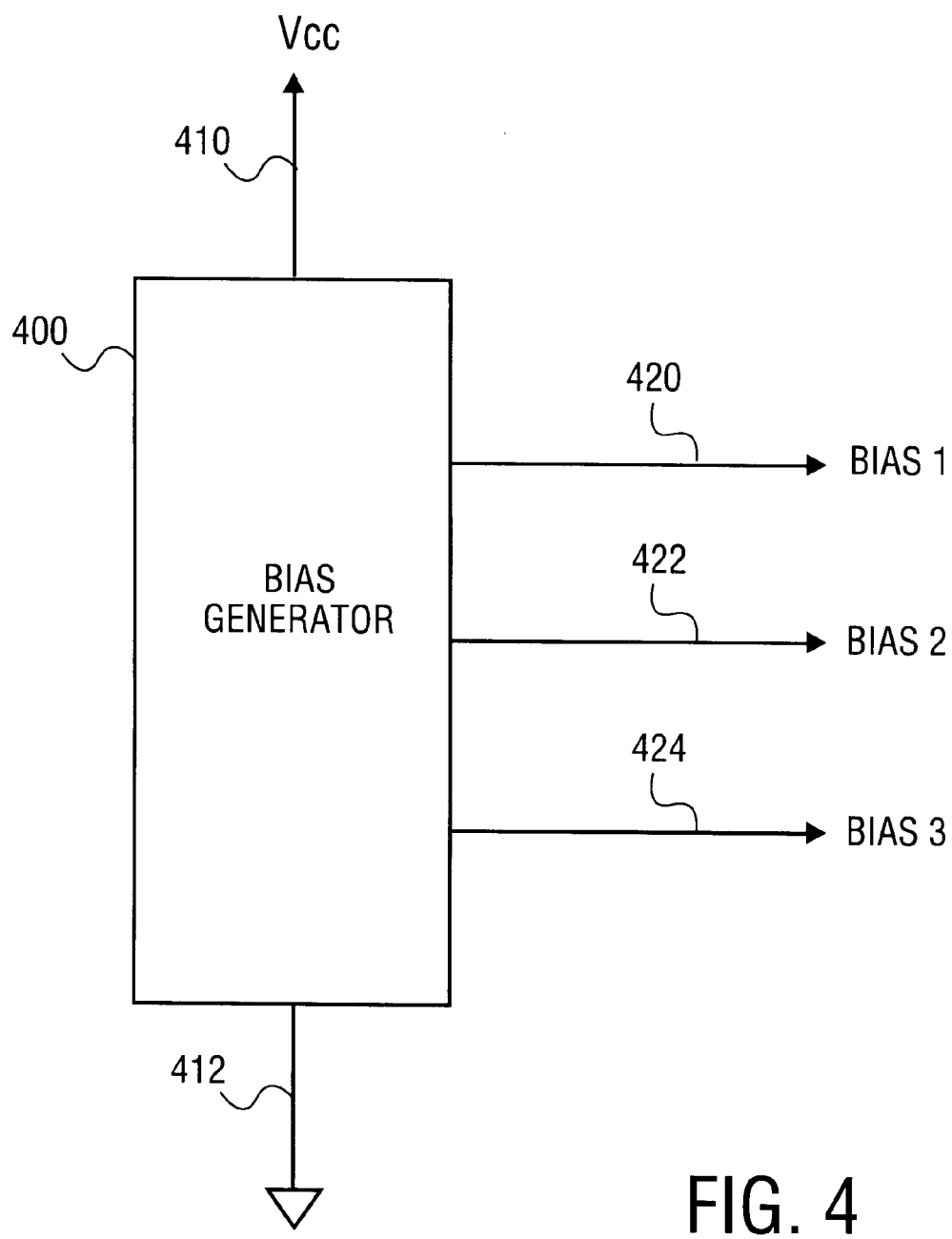
FIG. 4 is a schematic diagram of a bias generator for the half-circulator of FIG. 3, according to one embodiment of the present invention.

Referring now to FIG. 4, a schematic diagram of a bias generator 400 for the half-circulator of FIG. 3 is shown, according to one embodiment of the present invention. The individual bias voltages, bias 1, bias 2, and bias 3, are selected to keep the corresponding NMOS or PMOS transistors operating in the saturation range, so that a constant voltage-to-current ratio across the transistor is maintained.

Figure 5:
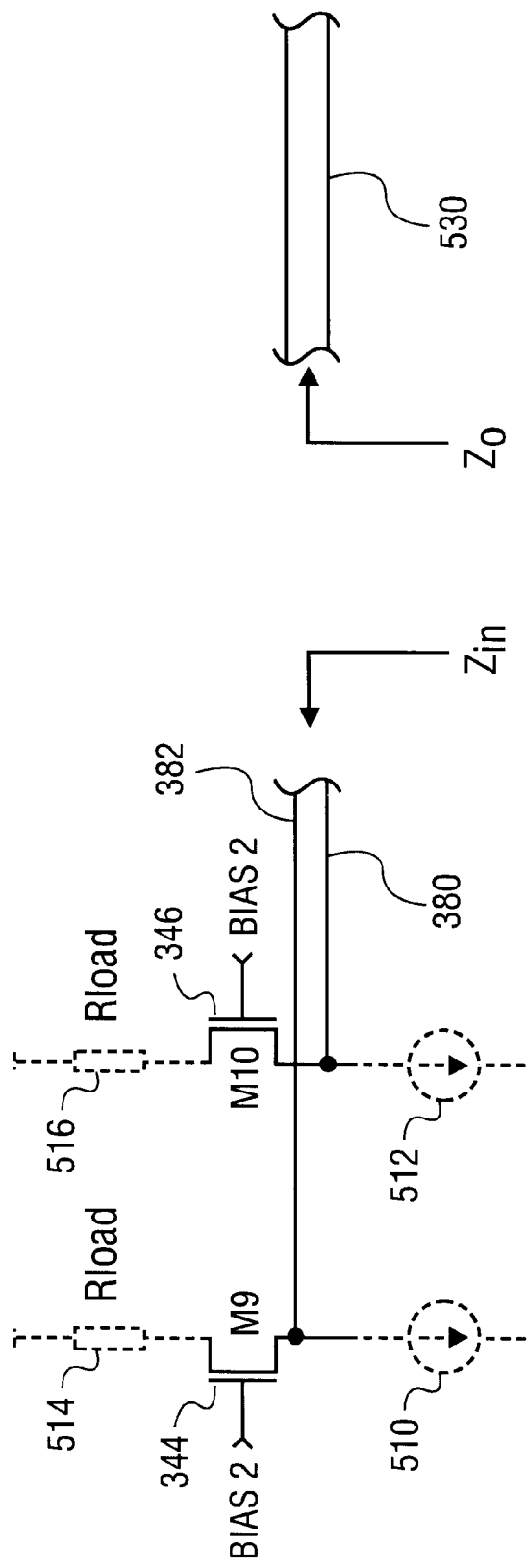
FIG. 5 is a detail schematic diagram illustrating the concept of matching the bus characteristic impedance by means of common-gate stages used in the half-circulator of FIG. 3, according to one embodiment of the present invention.

Referring now to FIG. 5, a detail schematic diagram of the matching termination to the bi-directional bus provided by the half-circulator 200 of FIG. 3 is shown, according to one embodiment of the present invention. The circuit of FIG. 5 is a simplification of portions of circuit of FIG. 3, and is used in the derivation of the size of the NMOS transistors 344, 346. Other parts of the half-circulator are represented in a simplified manner by resistors 514, 516 and current sources 510, 512. The physical size of NMOS transistors 344, 346 is selected to yield the proper value for the input impedance Rin.

Figure 6:
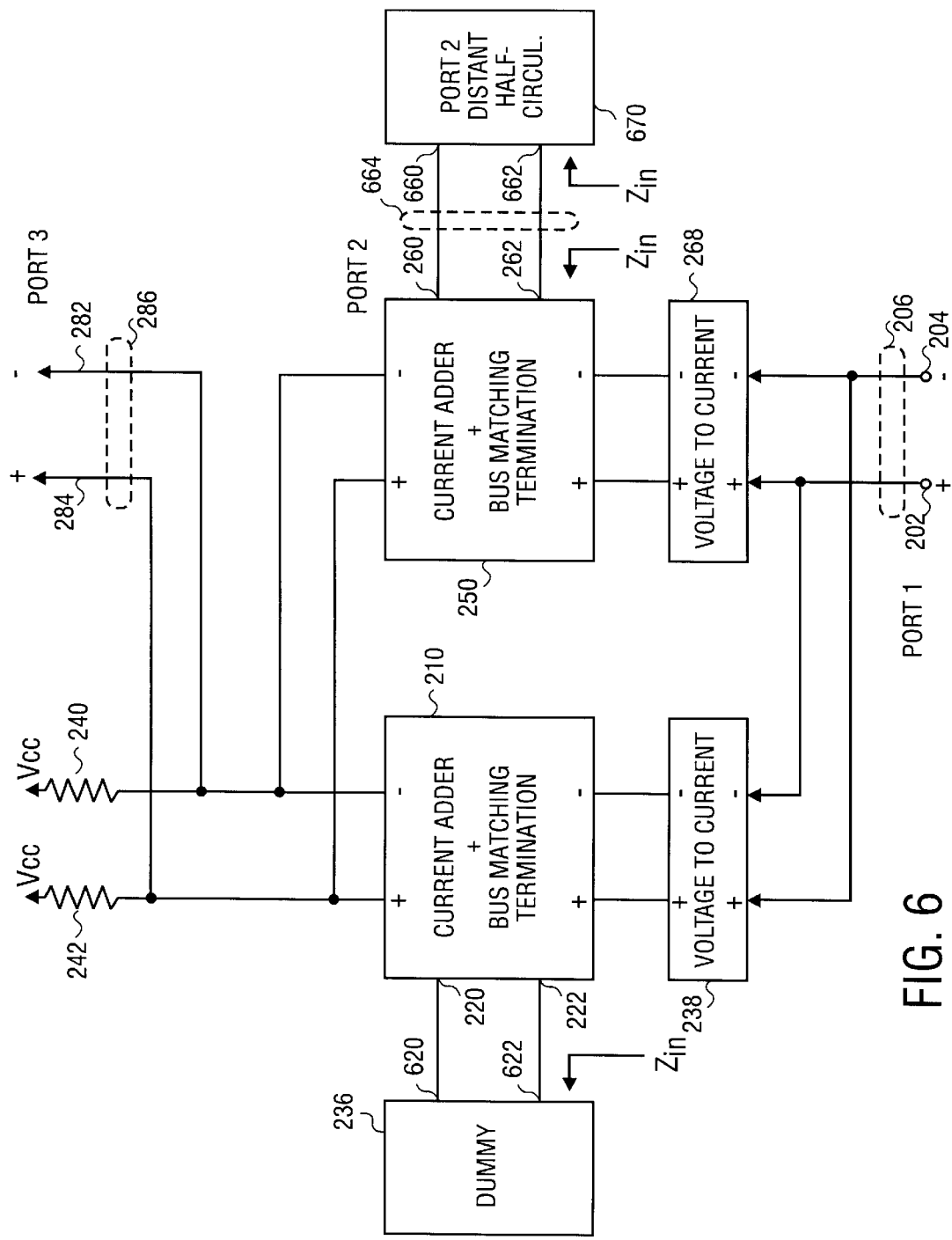
FIG. 6 is a schematic diagram of impedance matching the load presented by the dummy circuit of FIG. 3, according to one embodiment of the present invention.

Referring now to FIG. 6, a schematic diagram emphasizing the dummy circuit 236 of FIG. 3 is shown, according to one embodiment of the present invention. In the FIG. 6 embodiment, Zin is the measured impedance looking outward on bi-directional bus cabling 664 towards the port 2 of a distant half-circulator 670. As discussed above in connection with FIG. 5, the input impedance of current adder and bus matching termination 250 has been designed to equal this value of Zin. Current adder and bus matching termination 210 is designed to be a copy of current adder and bus matching termination 250, so therefore the input impedance of current adder and bus matching termination 210 is also Zin. To match this impedance, dummy 236 is designed to also have an input impedance equal to Zin.

Figure 7:
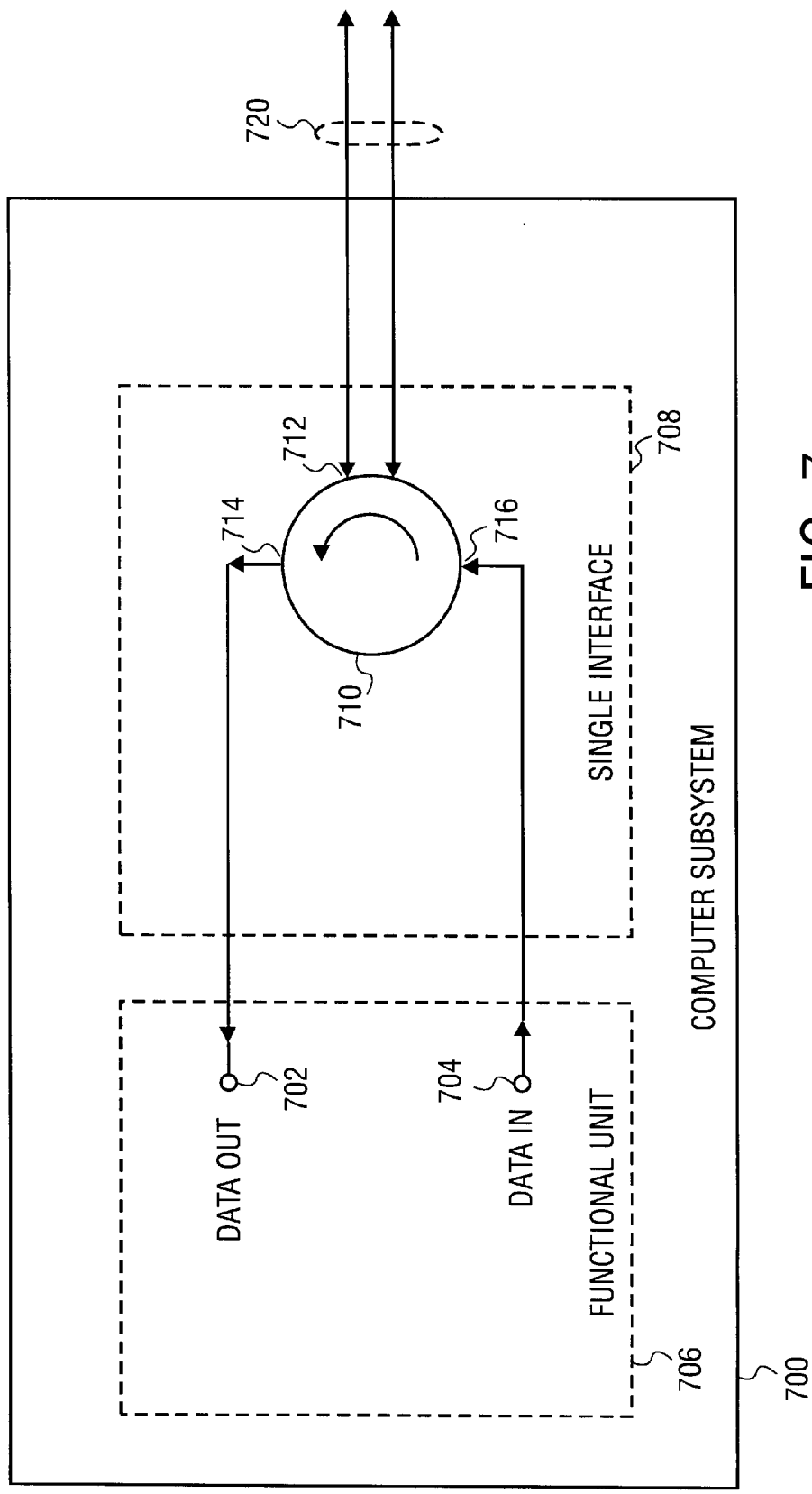
FIG. 7 is a block diagram illustrating a system utilizing a half-circulator to connect a bi-directional bus to a local parallel bus, according to one embodiment of the present invention.

Referring now to FIG. 7, a block diagram illustrating a computer subsystem 700 utilizing a half-circulator 710 to connect a bi-directional bus to a local parallel bus is shown, according to one embodiment of the present invention. A half-circulator 710 within a single interface 708 may send and receive data over a bi-directional bus 720. Data received may be supplied through port 3 714 of the half-circulator 710 and provided to functional unit 706 at terminal 702. Data sent from functional unit 706 at terminal 704 may enter port 1 716 of half-circulator 710 for transmission over bi-directional bus 720. In one embodiment, terminals 702, 704 may form portions of a parallel data bus within functional unit 706.

Figure 8:
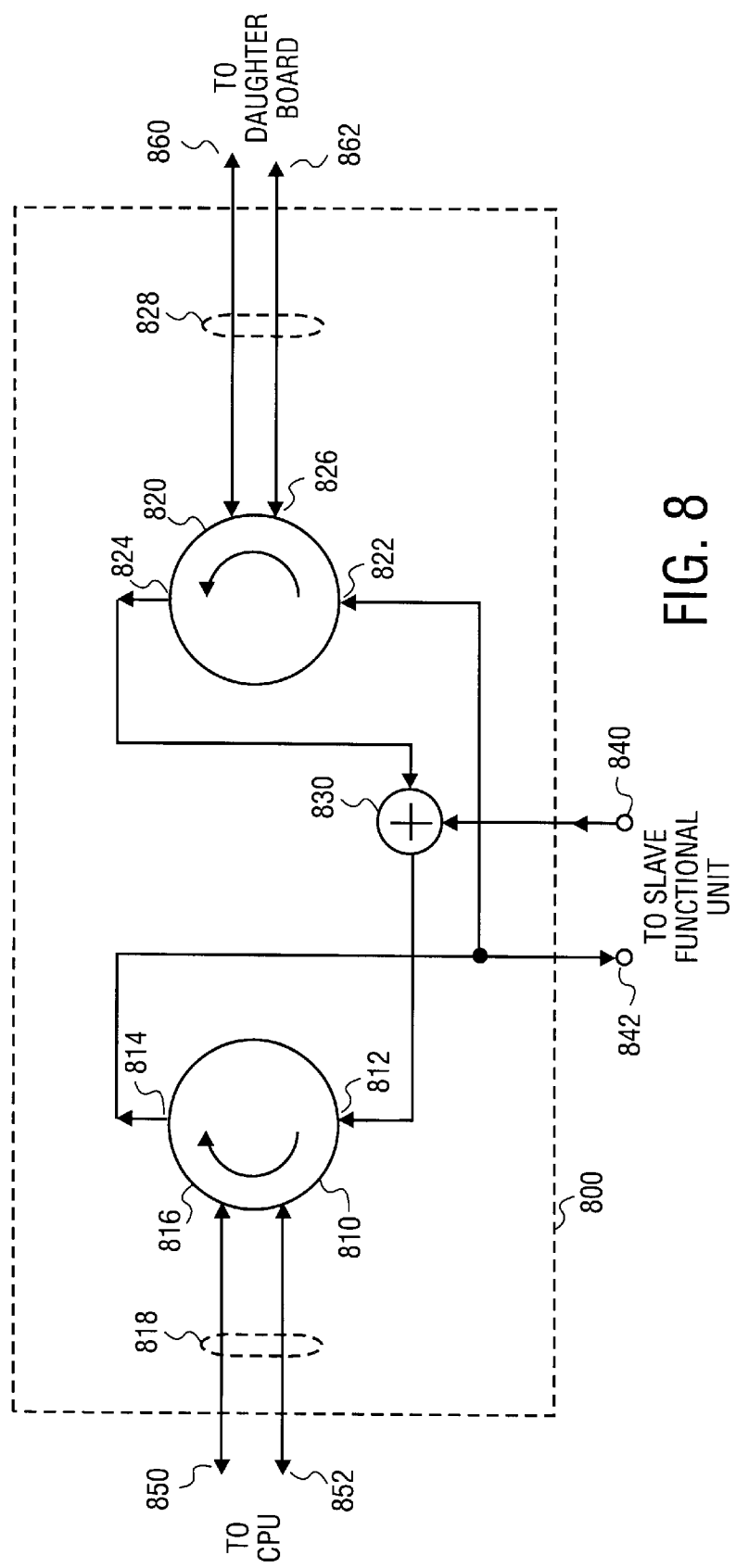
FIG. 8 is a block diagram illustrating a system utilizing a pair of half-circulators allowing the connection of a slave functional unit, according to one embodiment of the present invention.

Referring now to FIG. 8, a block diagram illustrating a system utilizing a pair of half-circulators allowing the connection of a slave functional unit is shown, according to one embodiment of the present invention. A single bi-directional bus has been configured into two segments, bi-directional bus 818 and bi-directional bus 828.

Data is sent to and from a central processing unit (CPU) from port 2 816 of half-circulator 810. Data received from port 2 816 is sent out from port 3 814 both to port 1 822 of half-circulator 820 and additionally to terminal 842 of a slave functional unit. This data arriving on port 1 822 of half-circulator 820 is then sent out via port 2 826 onto bi-directional bus 828.

Data arriving on bi-directional bus 828 into port 2 826 of half-circulator 820 is sent out on port 3 824. Data sent out on port 3 824 arrives at adder 830, where it is added to any data arriving on terminal 840 of the slave functional unit. This combined data is presented to port 1 812 of half-circulator 810 and is sent to the CPU over bi-directional bus 818 via port 2 816 of half-circulator 810.

Figure 9:
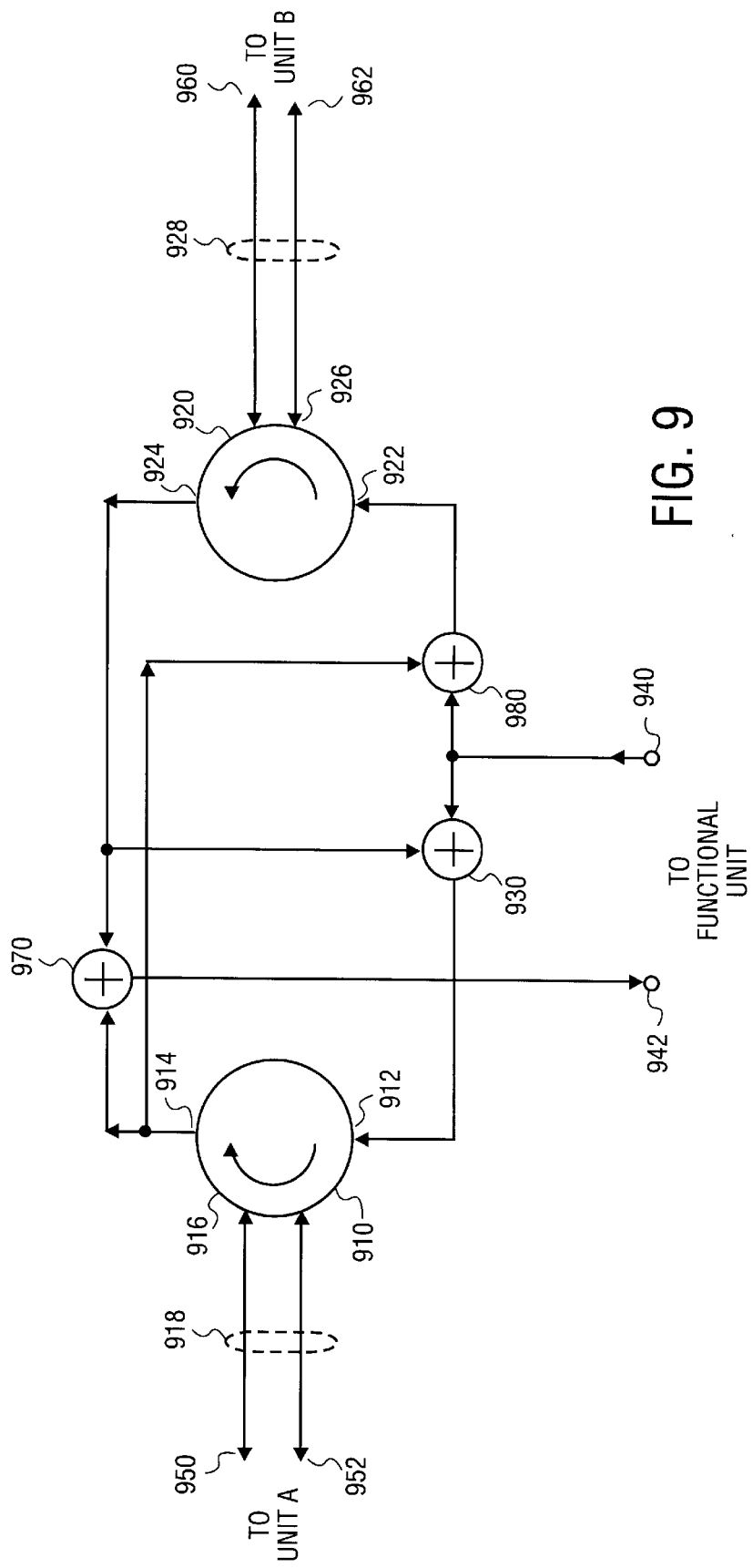
FIG. 9 is a block diagram illustrating a system utilizing a pair of half-circulators in a non-hierarchic bus allowing the connection of a functional unit, according to one embodiment of the present invention.

Referring now to FIG. 9, a block diagram illustrating a system utilizing a pair of half-circulators in a non-hierarchic bus allowing the connection of a functional unit is shown, according to one embodiment of the present invention. As in the FIG. 8 embodiment, a single bi-directional bus has been configured into two segments, bi-directional bus 918 and bi-directional bus 928. However, in the FIG. 9 embodiment two similar units, units A and B, are connected to bi-directional bus 918, 928, respectively. The FIG. 9 embodiment permits the sending of data to and from the functional unit from either unit A or unit B.

Data is sent to and from unit A from port 2 916 of half-circulator 910. Data received from port 2 916 is sent out from port 3 914 both to adder 970 and adder 980. Data arriving on adder 970 may be combined with data arriving from port 2 924 of half-circulator 920 and the resulting data presented on terminal 942 for the functional unit. Data arriving on adder 980 may be combined with data arriving from terminal 940 of the functional unit and the resulting data presented to port 1 922 of half-circulator 920.

Data arriving from unit B on bi-directional bus 928 into port 2 926 of half-circulator 920 is sent out on port 3 924. Data sent out on port 3 924 arrives at adder 930 and adder 970. The data arriving at adder 930 is combined with data arriving from terminal 940 of the functional unit. This combined data is presented to port 1 912 of half-circulator 910 and is sent to unit A over bi-directional bus 918 via port 2 916 of half-circulator 910. The data arriving at adder 970 is combined with any data from port 3 914 of half-circulator 910 and then sent on to terminal 942 of the functional unit.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus, comprising:
   a first current adder, coupled to a voltage-mode input port, and a voltage-mode output port; and
   a second current adder, coupled to said voltage-mode input port, said voltage-mode output port, and a current-mode port.

2. The apparatus of claim 1, wherein said current-mode port is bi-directional.

3. The apparatus of claim 2, wherein said current-mode port is AC coupled by a first coupling capacitor and a second coupling capacitor.

4. The apparatus of claim 3, wherein said first current adder is coupled to a dummy circuit, said dummy circuit providing an impedance load approximately equal to a characteristic impedance of said current-mode port.

5. The apparatus of claim 1, wherein said first current adder includes a first plus output terminal and a first minus output terminal, said second current adder includes a second plus output terminal and a second minus output terminal, where said first minus output terminal is coupled to said second minus output terminal and said first plus output terminal is coupled to said second plus output terminal.

6. The apparatus of claim 5, wherein said first plus output terminal is coupled to a first active pull-up resistor and said first minus output terminal is coupled to a second active pull-up resistor.

7. The apparatus of claim 5, wherein said first current adder includes a first plus input terminal and a first minus input terminal, said second current adder includes a second plus input terminal and a second minus input terminal, where said first minus input terminal is coupled to said second plus input terminal and said first plus input terminal is coupled to said second minus input terminal.

8. A method, comprising:
coupling a first current adder to a voltage-mode input port, and to a voltage-mode output port; and
coupling a second current adder to said voltage-mode input port, to said voltage-mode output port, and to a current-mode port.

9. The method of claim 8, wherein said coupling said second current adder to said current-mode port includes AC coupling with a first coupling capacitor and a second coupling capacitor.

10. The method of claim 9, wherein said coupling said first current adder includes coupling to a dummy circuit providing an impedance load approximately equal to a characteristic impedance of said current-mode port.

11. The method of claim 8, further comprising coupling a first minus output terminal of said first current adder to a second minus output terminal of said second current adder, and further comprising coupling a first plus output terminal of said first current adder to a second plus output terminal of said second current adder.

12. The method of claim 11, further comprising coupling said first plus output terminal to a first pull-up resistor and further comprising coupling said first minus output terminal to a second pull-up resistor.

13. The method of claim 10, further comprising coupling a first plus input terminal of said first current adder to a second minus input terminal of said second current adder, and further comprising coupling a first minus input terminal of said first current adder to a second plus input terminal of said second current adder.

14. An apparatus, comprising:
means for coupling a first current adder to a voltage-mode input port, and to a voltage-mode output port; and
means for coupling a second current adder to said voltage-mode input port, to said voltage-mode output port, and to a current-mode port.

15. The apparatus of claim 14, further comprising means for coupling said first current adder to means for matching characteristics of said current-mode port.

16. The apparatus of claim 15, further comprising means for coupling a first minus output signal of said first current adder to a second minus output signal of said second current adder, and further comprising means for coupling a first plus output signal of said first current adder to a second plus output signal of said second current adder.

17. The apparatus of claim 16, further comprising means for coupling said first plus output signal to a first pull-up resistor and further comprising means for coupling said first minus output signal to a second pull-up resistor.

18. The apparatus of claim 16, further comprising means for coupling a first plus input signal of said first current adder to a second minus input signal of said second current adder, and further comprising means for coupling a first minus input signal of said first current adder to a second plus input signal of said second current adder.

19. A system, comprising:
a first half-circulator including a first voltage-mode input port, a first voltage-mode output port, and a first small-signal current-mode port; and
a second half-circulator including a second voltage-mode input port, a second voltage-mode output port, and a second small-signal current-mode port coupled to said first small-signal current-mode port.

20. The system of claim 19, wherein said first half-circulator includes a first current adder coupled to said first voltage-mode input port, and to said first voltage-mode output port, and a second current adder coupled to said first voltage-mode input port, to said first voltage-mode output port, and to said first small-signal current-mode port.

21. The system of claim 20, wherein said first current adder and bus matching termination is coupled to a dummy circuit.

22. The system of claim 20, wherein said first current adder includes a first plus output terminal and a first minus output terminal, said second current adder includes a second plus output terminal and a second minus output terminal, where said first minus output terminal is coupled to said second minus output terminal and said first plus output terminal is coupled to said second plus output terminal.

23. The system of claim 22, wherein said first current adder includes a first plus input terminal and a first minus input terminal, said second current adder includes a second plus input terminal and a second minus input terminal, where said first minus input terminal is coupled to said second plus input terminal and said first plus input terminal is coupled to said second minus input terminal.

* * * * *

UNITED STATES PATENT AND TRADEMARK OFFICE
CERTIFICATE OF CORRECTION

PATENT NO.   : 6,445,220 B1
DATED        : September 3, 2002
INVENTOR(S)  : Franca-Neto It is certified that error appears in the above-identified patent and that said Letters Patent is hereby corrected as shown below:

Column 3,
Line 52, after "generating", insert -- differential --.

Column 4,
Line 9, after "PMOS", insert -- and --.
Line 36, after "bus", insert -- matching --.

Signed and Sealed this

Eighteenth Day of March, 2003

JAMES E. ROGAN
*Director of the United States Patent and Trademark Office*